United States Patent [19]
Allen

[11] Patent Number: 5,423,979
[45] Date of Patent: Jun. 13, 1995

[54] LIQUID DECONTAMINATION APPARATUS

[76] Inventor: Judith L. Allen, 12916 Kingsbridge La., Houston, Tex. 77077

[21] Appl. No.: 318,988

[22] Filed: Oct. 6, 1994

Related U.S. Application Data

[63] Continuation-in-part of Ser. No. 7,676, Jan. 22, 1993.

[51] Int. Cl.⁶ .................. C10M 17502; B01D 19/00; B01D 3/06
[52] U.S. Cl. .................. 210/168; 210/177; 210/180; 210/199; 208/185; 208/188; 208/208 R; 95/246; 95/249; 95/263; 96/194; 96/202; 203/91; 159/47.1; 261/DIG. 75
[58] Field of Search .............. 95/245, 246, 247, 248, 95/249, 250, 263; 96/194, 202, 207, 215; 210/177, 178, 180, 182, 199, 168, 416.5, 220; 261/DIG. 75; 208/185, 189, 188, 208 R, 187, 236; 203/91; 159/47.1

[56] References Cited

U.S. PATENT DOCUMENTS

| | | |
|---|---|---|
| 1,657,941 | 1/1928 | Sharples . |
| 1,735,546 | 11/1929 | Rath . |
| 1,761,152 | 6/1930 | Pew . |
| 1,823,185 | 9/1931 | Belden . |
| 1,898,168 | 2/1933 | Belden . |
| 1,988,773 | 1/1935 | Buender . |
| 2,477,318 | 7/1949 | Stevenson . |
| 2,494,392 | 1/1950 | Kirkbride . |
| 2,522,378 | 9/1950 | Kirkbride . |
| 2,639,289 | 5/1953 | Vogel . |
| 2,738,877 | 3/1956 | Beach . |
| 2,765,045 | 10/1956 | Meyers . |

(List continued on next page.)

FOREIGN PATENT DOCUMENTS

| | | |
|---|---|---|
| 2172583 | 8/1993 | Australia . |
| 1180298 | 1/1985 | Canada . |
| 41746 | 12/1981 | European Pat. Off. . |
| 1116611 | 2/1956 | France . |
| 1280688 | 11/1961 | France . |
| 2623730 | 2/1989 | France . |
| 3529638 | 7/1986 | Germany . |
| 480206 | 2/1938 | United Kingdom . |
| 532294 | 9/1938 | United Kingdom . |
| 1057911 | 2/1967 | United Kingdom . |
| 2202167 | 9/1988 | United Kingdom . |
| 1494924 | 6/1989 | U.S.S.R. . |
| 91-4309 | 4/1991 | WIPO . |

OTHER PUBLICATIONS

Abstract of Japan Patent 59-45398; Purification of Lubricating Oil-Mar. 1984.
Peuberthy Application Report for Oil/Water Separation, Section 1000, Application Report No. 1774, issued Dec. 1989.
Hydroscar Oil Purifier, Allen Filters Interprated, Springfield, Mo. Brochure.
Pardee Engineering; Miximg Air or Gas into a Liquid Using Pardee Eductor; May 1972.

Primary Examiner—Thomas M. Lithgow
Attorney, Agent, or Firm—Vaden, Eickenroht, Thompson & Feather

[57] ABSTRACT

In a multi-pass system for purifying oil or other liquids, an improved apparatus and method for mixing air with the contaminated liquid for separation after a phase change from liquid to gas. The contaminated liquid is drawn from a reservoir by a pump, filtered, and heated, and atmospheric air is induced into the contaminated liquid downstream of the heater by an eductor, which promotes the phase change from liquid to vapor. The liquid/contaminant mix, which now includes entrained air, is passed immediately through a second eductor, the compressibility of the air in tile mix, followed by expansion of the compressed air as the mix exits the second eductor, causing intimate contact of air and contaminant, thereby promoting the stripping of the contaminant from tile liquid. The air/liquid/contaminant mix is then routed to a level controlled separation tank, water vapor, contaminants, and condensate being released from tile tank ill the space above the pooled liquid. Purified, dry liquid is drawn from the tank by a second pump and delivered back to the reservoir.

6 Claims, 2 Drawing Sheets

U.S. PATENT DOCUMENTS

| | | |
|---|---|---|
| 2,765,259 | 10/1956 | Schwalge . |
| 2,890,765 | 6/1959 | Friedell . |
| 2,948,677 | 8/1960 | Austin . |
| 3,369,735 | 2/1968 | Hoffmesiter . |
| 3,481,113 | 12/1969 | Burnham . |
| 3,774,846 | 11/1973 | Schurig . |
| 3,977,972 | 8/1976 | Bloch . |
| 4,146,475 | 3/1979 | Forslard . |
| 4,545,892 | 10/1985 | Cymbalisty . |
| 4,680,091 | 7/1987 | Altman . |
| 4,690,764 | 9/1987 | Okumura . |
| 4,861,352 | 8/1989 | Cheng . |
| 4,938,876 | 7/1990 | Ohsol . |
| 5,092,981 | 3/1992 | Russo . |
| 5,156,747 | 10/1992 | Weber . |
| 5,314,613 | 5/1994 | Russo . |

LIQUID DECONTAMINATION APPARATUS

BACKGROUND

This application is a continuation-in-part of co-pending application Ser. No. 08/007,676, filed Jan. 22, 1993 and entitled "IMPROVED FLUID DECONTAMINATION APPARATUS AND METHOD."

FIELD OF THE INVENTION

This invention generally relates to an improved apparatus and method for removing contaminants from liquids. More particularly, this invention relates to removing contaminants from liquids, wherein the contaminant liquids usually have a high vapor pressure relative to the contaminated liquid and can either be present as a separate liquid phase or be dissolved in the fluid. Contaminants can also be gases, which are usually dissolved in the fluids.

DESCRIPTION OF THE PRIOR ART

Many types of liquids require decontamination. One of the most frequently decontaminated liquids is oil for use as a lubricant. Oils in contact with relatively small quantities of a contaminant liquid such as water will dissolve and absorb the liquid up to its saturation limit in the oil. An excess of the contaminant liquid beyond saturation will result in the formation of a separate liquid phase within the oil. When the liquid is water, the term "free water" is used to describe this second liquid phase. Oil in contact with gases (including water vapor) dissolves these gases generally in accordance with Henry's Law. Both dissolved liquids and gases can cause problems with oils and with equipment in contact with the oils.

The main contaminant in oil is water. However, hydrogen sulfide, oxygen, hydrocarbons, and other organic compounds such as alcohols, aldehydes, and ketones can be dissolved and absorbed by the oil and can also form separate phases within these oils.

Contaminants adversely affect lubrication oils in many ways. For example, when the compounds listed above are absorbed by oil, the oil viscosity is reduced, which reduces the ability of the oil to lubricate the moving or bearing surfaces in machinery. The modification of oil viscosity normally leads to a reduction in the thickness of the protective lubricating oil film on the machinery surfaces and, thus, metal-to-metal contact is increased. This leads to high rates of wear and poor machinery performance.

In addition to viscosity reduction, water and acid gases, such as hydrogen sulfide and hydrogen cyanide, cause corrosion to the surfaces they contact. Particles of corrosion products flake off of metal surfaces and increase wear via abrasion of the metal surfaces.

Water and volatile gases can also cause erosion of metal surfaces via another mechanism. This erosion of metal surfaces is caused by the rapid vaporization that occurs when the lubricating oil containing the volatile gases heats up as it passes through and between the bearings, gears, and other highly stressed surfaces, causing sudden vaporization. The resultant rapid increase in oil and gas velocity past the surface causes erosion. This is often referred to as cavitation.

Transformer oils are mostly contaminated by water, which usually enters in the form of a gas and is absorbed into the oil. The absorbed water reduces the dielectric constant of the oil, which leads to inefficiencies within the transformer and, in the extreme, can lead to an explosion due to arcing and vaporization of the transformer fluids.

Hydraulic oils are mostly contaminated by water, which also enters as water vapor normally into the storage compartment. The dissolved water usually causes corrosion within the hydraulic system.

Edible oils, such as for example vegetable oils, contain dissolved water. The water enters the oil during the extraction process from the plant and during oil storage, when water vapor condenses from air into the oil. The oil, dissolved water, and free water all contain dissolved oxygen. The water in the oil allows the oxygen to act on the oil and cause oxidation and therefore rancidity of the oil, spoiling it as a foodstuff. For this reason, antioxidants are usually added to edible oils. These antioxidants are chemicals which tend to block the oxidation action of oxygen and/or water on oxidizable fractions of the oil. Without these antioxidants, edible oils would rapidly spoil and become unfit for human consumption.

Water is the principal contaminant removed from oils to overcome the problems described above. Water is present in the oil in various combinations and forms. Free water is present as a separate phase from the oil and separates as such when standing. Emulsified water, which although present as a separate phase, is so finely dispersed, that surface tension forces are not large enough to allow free settling of the water when standing. In general, emulsified water cannot be separated by purely mechanical means. Water is also dissolved in oil, thereby creating an oil/water solution. It is an integral part of the solution and cannot be removed by mechanical means (i.e., standing, filtration or centrifuging). Dissolved water exists up to the saturation limit, which varies with the type of oil and its temperature. Once the saturation limit is reached, the oil cannot accommodate any more dissolved water and any excess water appears as a separate phase, as either free and/or emulsified water.

In addition to water resulting from absorption into the oil from the gaseous phase, oils may be contaminated by liquid water leaking into the oil system, particularly in hydraulic and lubrication oil systems where those systems are normally cooled against cooling water. Water can also enter these systems when it condenses out of the atmosphere above the oil, especially where the oil storage reservoirs are situated in close proximity to steam turbines or steam vents. These means of gross contamination require extensive water removal if catastrophic failure of the lubrication system and the machinery it is protecting is to be avoided.

Contamination levels of water can vary from a few hundred parts per million (hereinafter "ppm") up to many thousands of ppm. Some lubrication systems can have periodic gross contamination of up to 10% water in the oil.

The desired level of water in the oil is less than the saturation level for the operating temperature. For example, most lubrication oils operate in the temperature range 30° C. to 80° C. At 30° C., a typical saturation water level in oil is 100 ppm, whereas a typical saturation water level at 80° C. is 500 ppm. However, most lubrication oils give superior performance when water levels of less than 100 ppm are present in the oil supply to the bearing or gear. A figure of less than 50 ppm in the oil supply ensures that the oil is in a condition where it has no free water in it and will have the capacity to absorb any liquid water or any water vapor that comes into contact with the oil. At these low levels, water is not readily available to cause viscosity changes in the oil or to cause corrosion or erosion damage.

Commercially available decontamination techniques comprise coalescers, centrifuges and filters that purport to remove free water. The first two items cannot remove dissolved or emulsified water. Furthermore, filters which are commercially available may cause some coalescing of free water for removal, but cannot remove dissolved water and dissolved gases and are only effective at removing solid dirt loads.

Vacuum dehydrators can remove all forms of water and dissolved gases. However, they are complex, bulky, and very expensive. It is also very difficult to apply them to small compact systems. Dehydrators are usually regarded as only viable in large complex systems.

Australian Patent No. 71431/81 teaches that sealed oils can be reclaimed by passing an inert gas countercurrent to the sealed oil in either a trayed or packed tower at predetermined pressure and temperatures ranging from 20° C. to 120° C. U.S. Pat. No. 4,146,475 teaches the flashing of volatile liquid contaminants in oils but does not provide for a carrier or stripping gas for the removal of the volatile components. Similarly, U.S. Pat. No. 4,261,838 teaches flashing the contaminant components of heated oil under a vacuum but provides no positive stripping means for physically removing the volatile contaminants. U.S. Pat. No. 3,977,972 teaches that sealed oil can be decontaminated, and thereby reclaimed, by stripping in a drum supplied with air or nitrogen bubbled through under pressure. The volumetric ratios of gas to liquid required to achieve the objective is between 900:1 and 1800:1.

Australian Patent No. 554116 teaches that oil contaminants can be removed using dry air or inert gas to strip the contaminants in a separation or flash chamber packed with packing. Although one of the four examples in the patent include a nitrogen pump/feed mixer, it is apparent that the pump/feed mixer does not have high contact efficiency because of the requirement for packing to be used in the flash chamber to provide sufficient surface area for mass transfer.

Most of the reclamation processes taught in the prior art mentioned above suffer from poor efficiencies and/or bulkiness.

U.S. Pat. No. 3,977,972 discloses that 2 to 4 scfm of air or inert gas is required per square foot of total cross sectional area for seal oil flows of 1 gal. per hour. This implies air or inert gas flow to oil flow ratios of between 900:1 to 1800:1. All of the aforementioned disclosures that use a stripping process require the stripping medium (e.g., air or inert gas) to be supplied at pressure above atmosphere.

Patent Cooperation Treaty Patent Application No. WO 91/04309 provides a solution to many of these problems by employing an eductor, or jet compressor, to draw air (e.g., the stripping agent) into the contaminated oil. The eductor is a device which uses the pumped fluid (in this case, oil with contaminants) under pressure as a suction device to draw air into the eductor. In the inlet of the eductor, the fluid is pumped through a small nozzle. The fluid exits the nozzle in a high speed jet stream into a larger diameter throat. The throat includes a transition surface in the region of the nozzle, a straight diameter throat and a diffuser section. The expansion and resulting pressure loss of the pumped fluid causes a pressure lower than atmospheric pressure to exist in the region near the nozzle exit. Because of the suction effect of pressure lower than atmospheric, air is drawn into the fluid stream. The reaction of the high velocity, low pressure, and turbulence of the decelerating fluid causes a mixing of the pumped fluid and the drawn in air.

PCT Application No. WO 91/04309 employs a tube immediately after the diffuser section of the eductor exhaust. The theory of operation of the tube is that the air can more thoroughly come in contact with the contaminants if more time is allowed for the air and the oil stream to mix while in contact. Thus, this tube at the outlet of the air jet eductor is called a residence time chamber. The patent application describes the contact time of the air and oil/water fluid in the residence time chamber as 0.4 to 0.03 seconds. In this short time, the turbulence of the stream is reduced from that of the eductor throat and of the diffuser immediately preceding the tube. This turbulence reduction is due to the streamlining effect of the constant inside diameter of the residence time chamber. The "time" in contact is stated as an advantage, but any advantage is short lived, and the ability of this tube to increase oil/water to air contact is limited.

The specification of that PCT application claims that an air-to-oil mix ratio of 3:1 up to 9:1 is achievable utilizing the combination of eductor and residence time chamber. However, this air-to-oil mix ratio is too low for the device to work efficiently if the temperature significantly drops below approximately 170° F.

It is therefore a feature of the present invention to provide an improved apparatus and method of decontaminating liquids which functions over a broad temperature range.

It is a feature of the present invention to provide an improved gas-to-liquid ratio in an apparatus and method for stripping contaminants from liquids.

SUMMARY OF THE INVENTION

These and other features are accomplished, in accordance with the illustrated embodiments of the present invention, by an apparatus and method for decontaminating a contaminated liquid stored in a reservoir. The machine includes a pump for moving the contaminated liquid out of a reservoir and means for heating the contaminated liquid pumped out of the reservoir. The heated, contaminated liquid is pumped to first and second mixing means, each of the first and second mixing means having an inlet, a suction port, and an outlet. Gas is drawn into the mixing means at the suction port and mixed into the contaminated liquid passing therethrough. The outlet of the first mixing means connects directly to the inlet of the second mixing means, the second mixing means being larger than the first mixing means. The gas/contaminated liquid mixture exits the second mixing means into a separation chamber that is connected to the outlet port of the second mixing means. The gas and contaminates move to the top of the chamber and the liquid falls to the bottom of the chamber, thereby decontaminating the contaminated liquid.

DESCRIPTION OF THE PREFERRED EMBODIMENTS

Figure 1:
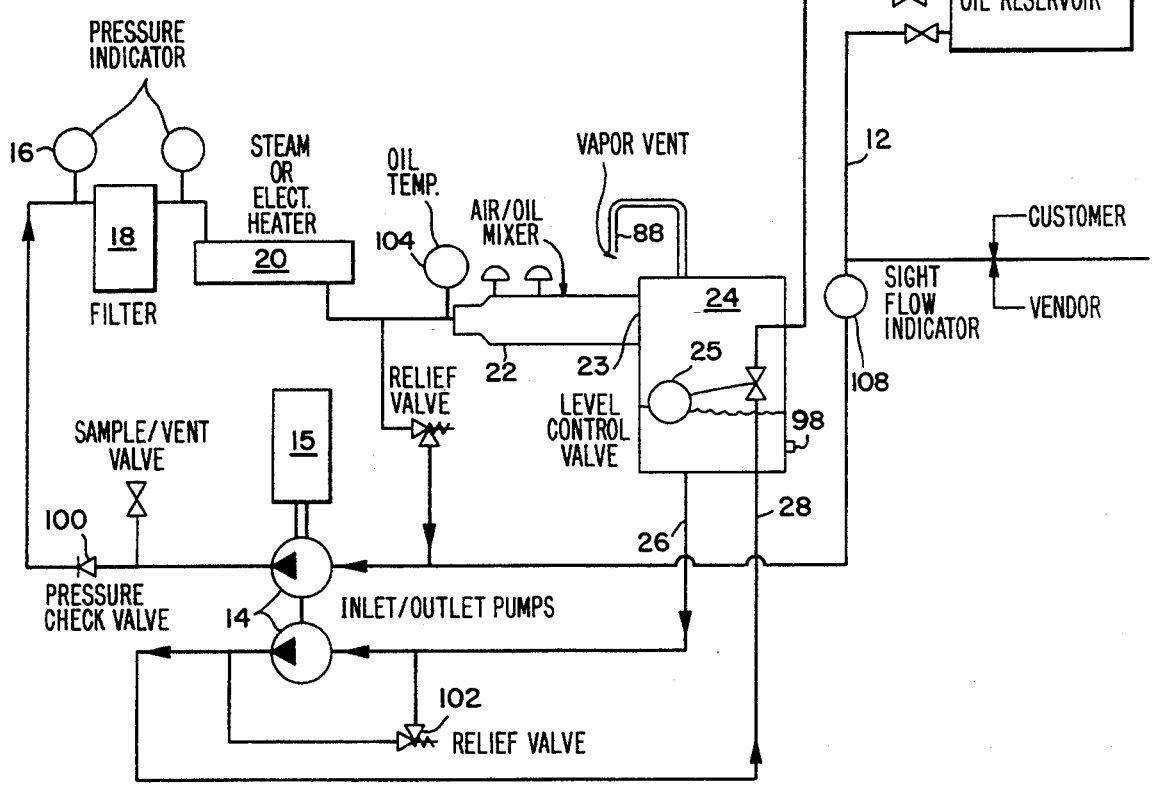
FIG. 1 is a schematic diagram of the liquid decontamination system in accordance with the present invention.

In order that the invention may more clearly be understood, reference will now be made to the accompanying drawings. As shown in FIG. 1, contaminated oil or other liquid contained in reservoir 10 is pumped through line 12 by pump 14, which in a preferred embodiment of this invention is a double spur gear pump driven by motor 15.

Pump 14 discharges the oil through a discharge line at a pressure predetermined to be most efficient for tile process, as disclosed hereinafter, and indicated on pressure gauge 16. The oil is filtered through filter 18 which is selected to suit the dirt load and quality of the oil to be decontaminated. The filter can be selected to remove solid particles in the range 0.5 micron to 300 microns, although a particle size range between 10 and 125 microns is preferable. The principal objective of the filter is to remove dirt particles which would otherwise damage downstream equipment.

From the filter, the oil is passed through heater 20, which may be either steam or electrically heated. Heater 20 raises the temperature of the oil to 150° F. to 190° F. in the preferred embodiment of this invention; like the pressure, however, temperature can be varied in a manner predictable by those skilled in the art, who have the benefit of this disclosure. The oil is discharged from heater 20 and enters mixing means 22, where air is drawn in and mixed with the oil. From mixing means 22, the mixture enters flash drum 24, where the gas and vapors separate from the fluid. Pump 14 circulates the source fluid, and returns the decontaminated liquid to reservoir 10.

Figure 2:
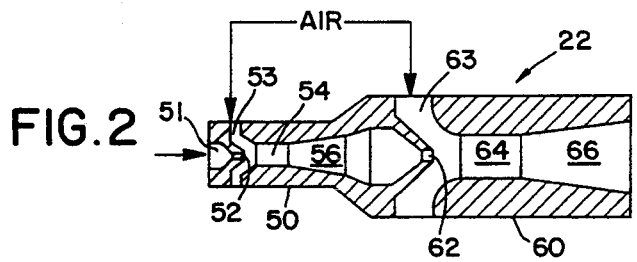
FIG. 2 is a cross-sectional view of the dual eductor gas liquid mixing device in accordance with this invention.

Referring now to FIG. 2, it can be seen that mixing means 22 comprises a pair of eductors 50 and 60 connected in series so that nozzle 52 of first eductor 50 receives the contaminated oil stream from heater 20 and nozzle 62 of second eductor 60 is the outlet of the first eductor 50. Air is drawn in through the suction port 53 of first eductor 50 at a rate of 3 to 8 cubic feet of air per cubic feet of pumped oil stream. The outlet of the first eductor is a stream comprised of oil, contaminate (e.g., water), and air. This stream immediately flows into nozzle 62 of the second, and larger eductor 60 in the pair.

Nozzle 62 of second eductor 60 must be of a larger size than nozzle 52 for two reasons. The first is that the stream pressure out of first eductor 50, and thus into nozzle 62 of second eductor 60, is lower than the pressure into nozzle 52 of first eductor 50. A larger nozzle is needed to produce the suction required to draw air into suction port 63 of second eductor 60. The second reason is that the volume of the air/water/oil stream out of first eductor 50 is greater than the volume flowing into first eductor 50 because of the entrained air. This entrained air is compressed as it passes through second eductor nozzle 62. This compressed air then expands as the pressure of the entrained air/oil/water stream decreases upon exiting nozzle 62. This compression/expansion cycle draws more air into the contaminated oil stream. Second eductor 60 draws in 6 to 10 cubic feet of air per cubic foot of original contaminated oil stream. The resultant air-to-oil ratio for the stream exiting the second eductor is in a range of 9:1 to 18:1. This ratio compares to the range of 3:1 to 9:1 disclosed in the above-referenced PCT Application No. WO 91/04309.

A second and more important aspect of the dual eductor system is that the flow turbulence caused by the function of the eductor components and the compression-to-expansion cycle of the entrained air/oil/water stream in the second eductor produces an intimate air-to-liquid contact. The residence time chamber described in PCT Application No. WO 91/04309 relies on just the time in contact to allow the air to strip the contaminants. The present invention, however, intimately mixes the air and liquid. The mixing that results from compressing and expanding entrained air; while also introducing severe turbulence, is quite different than the previous technology, as exemplified by the referenced PCT application, which streamlines the flow, causing less turbulence and relying solely on time to increase air-to-contaminant contact. The apparatus of the present invention more thoroughly mixes the air and liquid stream and provides a more intimate contact between the dispersed contaminant and the air at the correct temperature, which allows the contaminant to change phase and flash into a vapor. If the contaminant is an entrained gas, the intimate contact of the air and contaminant allows the air to act as a carrier and strip the contaminant out as it leaves the liquid.

Note also that the mixing effect achieved by this compression/expansion cycle is not merely the additional mixing that would result from the increased turbulence introduced into the stream by a second eductor. The oil/water mix entering first eductor 50 is relatively incompressible such that the mixing that occurs in throat 54 results from the turbulence caused by the expansion of the oil/water mix exiting nozzle 52 and the drawing of air in through suction port 53. That same turbulence results in the mixing of the stream exiting nozzle 62 in throat 64 of second eductor 60. However, the mixing which occurs in second eductor 60 is enhanced by the compressibility of the air/oil/water mix entering nozzle 62 from the closely coupled diffuser 56 of first eductor 50. It is the severe turbulence which results from the second expansion cycle that makes possible the intimate contact between the air and the oil in the stream. Indeed, experimentation has shown that the resulting air/water contact is so intimate that it is possible to reduce the water content of, for instance, lubrication oils to less than 50 ppm using this method.

In order to obtain the desired output pressure of the air/oil/water mix from second eductor 60, two eductors 50 and 60 must be sized relative to the input pressure of the contaminated liquid into the first eductor. The pressure of the contaminated liquid going into first eductor 50 is measured at nozzle 52 of eductor 50. Determining the size of nozzle 52 of eductor 50 is based on classic eductor theory relationships, including the eductor size ratio.

The following define the variables which affect the eductor size relationships:

$$R = (A_n)/(A_t) \quad (1)$$

$$M = q_3/q_1 \quad (2)$$

$$H = (P_2 - P_3)/(P_1 - P_2) \quad (3)$$

where R represents the eductor size ratio; $A_n$ and $A_t$ are the cross-sectional areas of the nozzle and throat, respectively; M represents the volumetric flow rate ratio; $q_3$ represents the volume of the air flow; and $q_1$ represents the volume of the oil flow; H represents the pressure relationships between $P_1$, the pressure at the nozzle inlet 51; $P_2$, the pressure at diffuser 56 outlet; and $P_3$, the pressure at eductor suction port 53.

PATENT

The method for sizing eductor 50 is based on these classical eductor relationships since the incoming contaminated oil does not contain entrained air. The pressure of $P_1$ is controlled and the suction pressure $P_3$ is related to the vapor pressure of the contaminant (e.g., water) at a given operating temperature normally determined by being read off of standard vapor pressure charts, which in the preferred embodiment of this invention is about 180° F. However, the present invention is capable of efficient operation at temperatures as low as about 150° F. The area of nozzle 52 of eductor 50 is determined from the following relationship:

$$q_1 = A_n * (SQRT((772 * (P_1 - P_3))/(1.15 * d))) \quad (4)$$

where "d" represents the density of the incoming contaminated oil. Since the pressures involved are less than 500 psi, the application calls for an H factor of between 0.15 and 0.35, an H factor closer to 0.15 being preferred. Therefore, the pressure at the outlet, $P_2$ can be determined. This pressure is then used as the inlet pressure for calculating the size of eductor 60. Since the outlet pressure of eductor 50 is the inlet pressure for eductor 60, eductors 50 and 60 are as closely coupled as possible to prevent pressure loss. The present invention is not limited to such a closely coupled connection, however. Additional calculations can be made to correct for the drop in pressure at the nozzle of eductor 60 resulting from the length of the connection between eductors 50 and 60 as is known in the art.

As noted above, however, the input stream to eductor 60 includes air, which is compressible. Consequently, the size of eductor 60 is calculated by adapting the relationships described above to allow for the compressibility of the entrained air in the nozzle inlet oil as follows. The inlet suction pressures for eductor 60 $P_1$ and $P_3$ are known. The area of nozzle 62 of eductor 60 is established by the following equation:

$$P_1 - P_3 = 11.11 * (1 + x * (P_1/P_3) * ((d/772) * (Q_n/A_n)^2)) \quad (5)$$

where x represents the air-to-oil volumetric ratio and $Q_n$ represents the mass flow rate through eductor 60. Since eductor 60 is operating at low pressures (i.e., less than about 100 psi), and the stream includes a large proportional quantity of air, the H factor for eductor 60 does not vary much from 0.59. Therefore, the maximum system discharge pressure, e.g., the pressure $P_2$ at the outlet of diffuser 66, is established. These relationships are evaluated for various flow conditions and the pressures at a given operating temperature and the areas of the nozzles are optimized in a manner that will be apparent to those skilled in the art, who have the benefit of this disclosure to give stable performance over the applicable range of conditions. To obtain maximum mixing efficiency, the eductor size ratio for each eductor must be optimized. In a presently preferred embodiment, the first eductor size ratio ranges between about 0.15 and about 0.30. The second eductor size ratio is approximately 0.5. With these R values, and the respective nozzle areas, the area of the respective throats is determined from these relationships. For purposes of convenient reference, it is generally preferred to express the relationship between the sizes of the two eductors as a ratio of the R values, i.e., a ratio of ratios. As can be seen from the previously set out preferred ranges of $R_1$ (i.e., the ratio of the area of nozzle 52 to the area of throat 54) and $R_2$ (i.e., the ratio of the area of nozzle 62 to the area of throat 64), the preferred $R_1:R_2$ is between about 0.6 and about 0.3 for the operating conditions set out herein.

The outlet of eductor 60 is fed directly into flash drum 24. The design of flash drum 24 allows the intimately mixed air and liquid to separate by forcing the air/oil stream to spread out over a large surface area as it travels down to the residing liquid level in flash drum 24. Spreading the stream over a large surface area also slows the velocity of the stream as it enters the accumulated liquid and reduces the tendency to trap air by splashing. An area of the flash drum flashing surface 300 to 600 times the cross-sectional area of the main piping for the flow system is preferably employed. The pipe is typically one inch pipe for 100 to 200 gallons per hour of liquid circulation capacity such that the surface area of the contact surface is between about 250 to about 500 square inches (1¾ to 3½ square feet).

Figure 3:
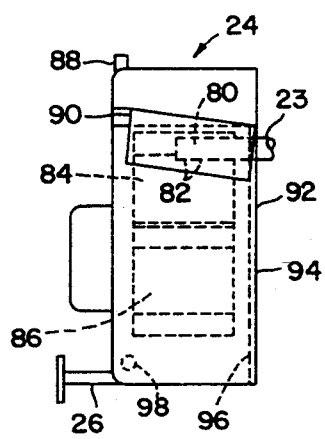
FIG. 3 is a side view of the flash chamber where gases and vapor are separated from the liquid in accordance with the present invention.
Figure 4:
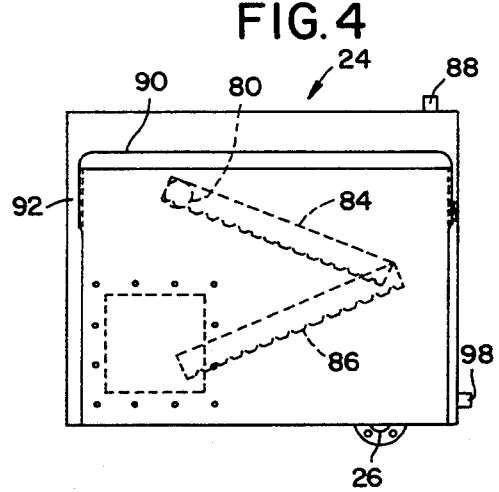
FIG. 4 is a cross-sectional view of the flash chamber shown in FIG. 3.

FIGS. 3 and 4 show the side and front views of the flash drum assembly made in accordance with the preferred embodiment of this invention. Inlet 23 is connected to diffusing pipe 80 which enters the inside of flash drum 24. The contaminated oil/water/air mixture exits pipe 80 through holes 82. The mixture is sprayed onto sliding board 84, flows down sliding board 84, and subsequently drops onto and flows over sliding board 86. Both sliding boards are preferably made of expanded metals to enhance the turbulent motion of the mixture, thereby allowing ample opportunity to dislodge the gas from the oil. The contaminant-laden air is vented from flash drum 24 through vapor vent 88 at the top of the drum.

When the liquid reaches the bottom of flash drum 24, it is pumped out line 26 back into reservoir 10 along line 28. Float valve 25 is attached to line 28 to maintain a relatively constant level of liquid in flash drum 24.

The process of removing moisture laden air from the flash drum is enhanced by means for preventing condensate from forming on the colder surfaces of the flash drum and falling back into the oil stream and re-contaminating the oil in the form of a collector plate 90 that is suspended in the drum above diffuser pipe 80. Due to the proximity of collector plate 90 to the stream of heated air/oil/water mix, plate 90 is maintained at a temperature at which water vapor does not condense on that plate. Any condensate that forms does so on the inside surfaces of, for instance, the top of flash drum 24 and then drops onto the top of collector plate 90 to be drained off into area 92 formed by outer wall 94 and inner wall 96, inner wall 96 containing the decontaminated oil. The amount of condensate which forms and drops onto plate 90 is too small to lower the temperature of collector plate 90 to a temperature low enough to cause condensation on that plate. The condensate is then removed from the system through outlet port 98.

There are several additional features added into the system for the convenience of the user and to provide safety and prevent damage. For example, pressure check valve 100 and safety vent valve 102 are incorporated into the system to prevent damage to the system in the event of excessive pressure buildup. Several gauges are also incorporated into the system to monitor the functioning of the system, including pressure indicator 16, oil temperature indicator 104, air flow indicator 106, and sight flow indicator 108.

Figure 5:
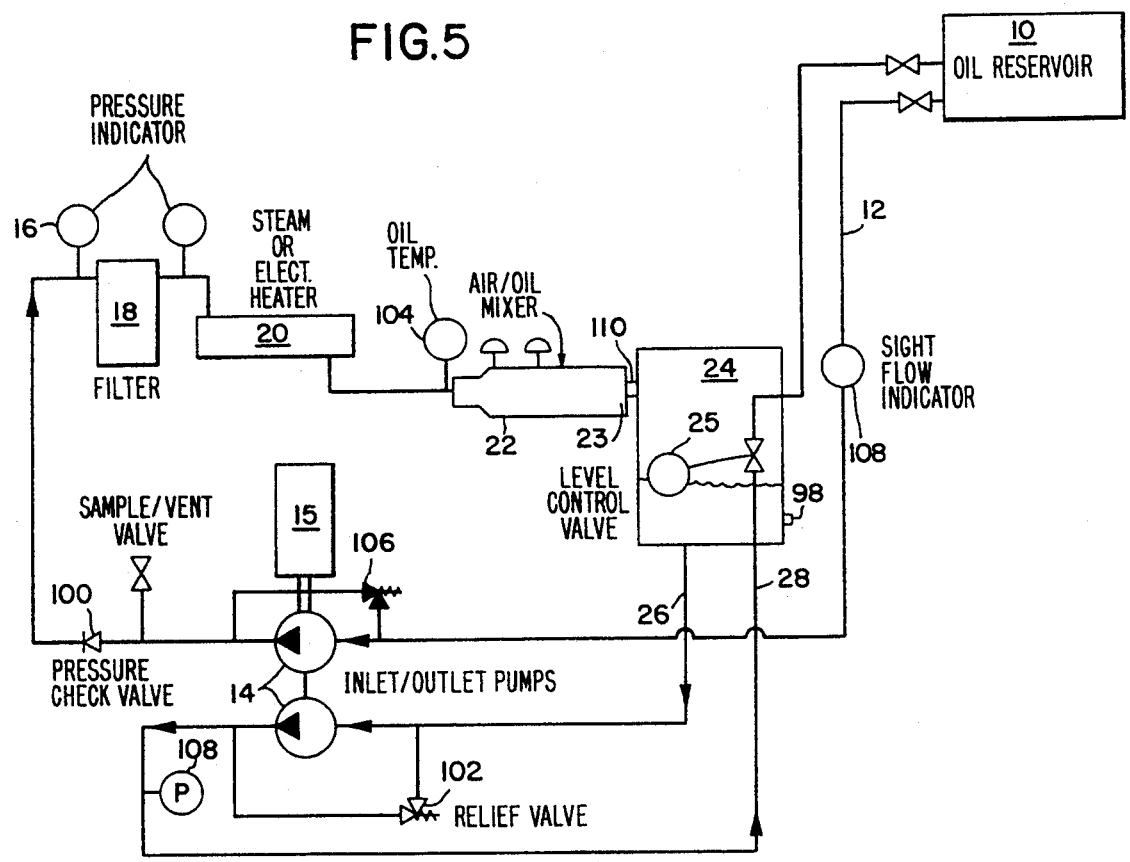
FIG. 5 is a schematic diagram of the fluid decontamination system in accordance with the preferred embodiment of this invention.
Figure 6:
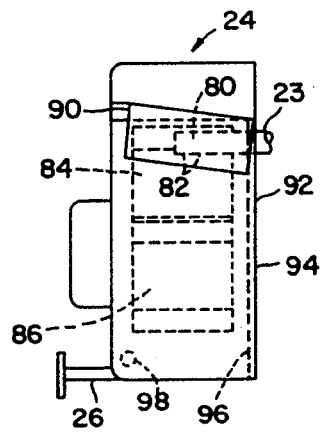
FIG. 6 is a side view of the flash chamber where gases and vapor are separated from the fluid in accordance with the preferred embodiment of this invention.
Figure 7:
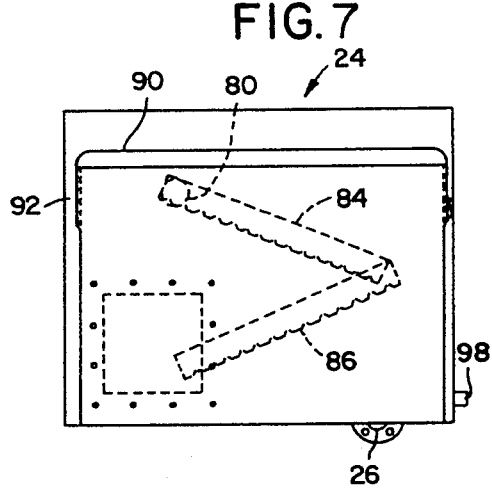
FIG. 7 is a cross-sectional view of the flash chamber shown in FIG. 6.

FIGS. 5-7 show another preferred embodiment of this invention. The differences from the embodiment described above are that (1) vapor vent 88 has been removed, (2) the un-numbered relief valve shown in FIG.1 has been moved and is shown as relief valve 106 in FIG. 5, (3) pressure sensor 108 has been added to line 28 to assure proper pressure monitoring and (4) connector 110 has been added to connect air/oil mixer 22 directly to separation chamber 24. With the removal of vapor vent 88, all contaminants are now removed from outlet port 98.

Preliminary test results show that by removing the residence time chamber (described in the above referenced PCT Application No. 91/04309) and including a second eductor 60 in line with first eductor 50, performance gains are achieved due to the simultaneous increases in the air/gas volumes and mixing efficiency. This performance enhancement technique is directly contrary to the technique espoused in the above referenced PCT Application No. WO 91/04309, which teaches the use of a residence time chamber to enhance air and contaminant contact by eliminating turbulence in the mixture flow after the eductor and prior to entering the separation chamber. The written description and graphical representation in WO 91/04309 lead to the conclusion that the primary function of the residence time chamber is to streamline the flow of the oil and air mixture.

By comparison, the claimed invention in its preferred embodiment is designed so that the mass and heat transfer is enhanced by turbulent action of entraining air with the oil in first eductor 50 and re-compressing and re-expanding the mixture with more air in second eductor 60, rather than by streamlining the mixture flow. The introduction of the second eductor in the present invention increases the turbulence in the flow prior to entering the separation chamber. In addition, the preferred embodiment employs a 90° elbow as connector 110 to attach second eductor 60 and separation chamber 24 which contributes to maintaining turbulence. The elbow does not streamline the flow of the oil/air mixture as is the function of the residence time chamber of WO 91/04309. Instead, use of the elbow introduces flow turbulence due to entrance and exit effects, and changes in the direction of flow.

From the foregoing it will be seen that this invention is one well adapted to attain the ends and objects hereinabove set forth, together with other advantages which are obvious from the specification and drawings and which are inherent to the apparatus. It will be understood that certain features and subcombinations of the invention are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative, and not in a limiting sense.

What is claimed is:

1. Apparatus for decontaminating contaminated liquid stored in a reservoir, comprising:
   a pump for moving the contaminated liquid out of a reservoir;
   means for heating the contaminated liquid pumped out of the reservoir;
   first and second mixing means, each having a nozzle, a suction port, and an outlet, for receiving the contaminated liquid from said heating means and for drawing in and mixing a gas through the suction port with the contaminated liquid, wherein the nozzle of the first mixing means is connected to the heating means, the outlet of said first mixing means is connected directly to the nozzle of said second mixing means, the nozzle of said second mixing means being larger than the nozzle of said first mixing means;
   a separation chamber connected to the outlet port of said second mixing means for receiving the mixture of gas and contaminate liquid therefrom, wherein the gas and contaminate move to the top of said chamber and the liquid falls to the bottom of the chamber, thereby decontaminating the contaminated liquid.

2. The apparatus of claim 1 wherein each mixing means includes a throat located downstream of the suction port and upstream of the outlet and the ratio of the areas of the nozzles to the areas of the throats of said respective first and second mixing means is between about 0.6 and about 0.3.

3. The apparatus of claim 1 further comprising a source of said contaminated liquid and wherein the relationships between the pressures $P_1$ at the nozzle inlet of said first mixing means, $P_2$ at the diffuser outlet of said first mixing means, and $P_3$ at the eductor suction of port of said first mixing means is specified as $H=(P_2-P_3)/(P_1-P_2)$, H ranging between 0.15 and 0.35 at pressures of less than 500 psi.

4. The apparatus of claim 3 wherein the H factor of said second mixing means is about 0.59 at pressures of less than about 100 psi.

5. The apparatus of claim 1 further comprising a source of contaminated liquid wherein the area of the nozzle $A_n$ of said second mixing means is given by the formula $$P_1 - P_3 = 11.11 * (1 + x * (P_1/P_2) * ((d/772 * Q_n/A_n)^2))$$

where $P_1$ is the pressure at the nozzle inlet, $P_3$ is the pressure at the suction port, x is the air to oil volumetric ratio, d is the density of the incoming mix of contaminated liquid and gas, and $Q_n$ is the mass flow rate through second mixing means.

6. The apparatus of claim 1 wherein a collector plate is suspended in said separation chamber above the connection to the outlet port of said second mixing means for preventing re-contamination of the liquid from condensate formation.

* * * * *